United States Patent Office 3,308,061
Patented Mar. 7, 1967

3,308,061
OZONE TREATMENT OF WASTE AQUEOUS EFFLUENT FROM ALKYLLEAD MANUFACTURE
Herman E. Collier, Jr., Bethlehem, Pa., assignor to E. I. du Pont de Nemours and Company, Wilmington, Del., a corporation of Delaware
No Drawing. Filed Mar. 5, 1965, Ser. No. 437,542
7 Claims. (Cl. 210—50)

This invention is directed to a process for removing dissolved alkyllead compounds from the aqueous effluent used in the manufacture of alkyllead compounds.

Tetraalkyllead compounds are highly useful anti-knock compounds and are manufactured commercially by alkylating a lead-sodium alloy with an alkyl chloride, such as ethyl chloride, methyl chloride or a mixture of methyl and ethyl chlorides.

In these processes, after the excess unreacted alkyl chloride has been distilled off, the rest of the reaction mass is drowned in a large volume of water and the tetraalkyllead steam distilled therefrom. The still residue is settled, the solids separated from most of the water and further washed with water to remove various lead-containing salts. The water from the settling, separating and washing steps constitutes waste aqueous effluent from the tetraalkyllead manufacturing process.

In order to remove certain sludge-forming impurities from the steam-distilled tetraalkyllead, the impure tetraalkyllead product is further subjected to an aeration or oxygen purification treatment in the presence of water as disclosed in U.S. Patent 2,400,383. The purified tetraalkyllead is then separated from the aqueous phase. This aqueous phase, containing some soluble alkyllead materials formed in the purification, also constitutes part of the aqueous effluent from the tetraalkyllead process.

The aqueous effluent from the tetraalkyllead process may be neutral but generally is strongly alkaline, usually having a pH between 11 and 12, due to the reaction of the water with unreacted sodium-lead alloy to produce sodium hydroxide. It contains large amounts of sodium chloride and small amounts of water-soluble organic lead compounds, such as those formed in the purification process described above. In addition to the above, a very small amount of water-soluble inorganic lead compounds are sometimes present in the aqueous effluent.

The disposal of the aqueous effluent from the tetraalkyllead process is a serious problem, since, in some locations, the maximum amount of soluble lead compounds allowed in aqueous effluent discharges is 5 parts per million parts of water.

The sodium chloride and sodium hydroxide compounds in the aqueous effluent naturally do not present a serious disposal problem. Moreover, the water-soluble inorganic lead compounds in the aqueous effluent do not pose a serious disposal problem since they can be easily removed from the effluent before discharge by simple adjustment of the pH to a range of from 8 to 9.5 in the presence of water-soluble carbonates as described in Canadian Patent No. 572,192. However, the soluble alkyllead compounds in the aqueous effluent, such as trialkyllead chlorides, trialkyllead hydroxides, dialkyllead dichlorides and dialkyllead dihydroxides, cannot be discharged into lakes and streams without causing a potential contamination problem. Moreover, the disposal of such soluble alkyllead compounds constitutes a significant loss of lead.

While the soluble inorganic lead compounds may be removed from the effluent by adjustment of the pH to about 8 to 9.5 in the presence of water-soluble carbonate as described above, or by precipitation with hydrogen sulfide or other soluble sulfides, the organic lead compounds are not satisfactorily removed by such treatment, and furthermore, any excess soluble sulfide in the effluent would be highly objectionable and would have to be removed from the aqueous effluent before its disposal.

It is, therefore, an object of this invention to provide a simple, economical and commercially practical process for treating the aqueous effluent from the manufacture of alkyllead so as to reduce the concentration of soluble organic lead compounds therein to a safe level without introducing other objectionable substances into the effluent.

It is another object of this invention to provide a simple, economical process for recovering most of the lead content from the aqueous effluent resulting from the manufacture of alkyllead.

These and other objects will become apparent from the following description and claims.

More specifically, the present invention is directed to a novel process for treating an aqueous effluent from the manufacture of alkyllead compounds and containing about 5 to 5,000 p.p.m. of lead as dissolved organic lead not precipitatable by pH adjustment to 8 to 9.5, which process comprises the steps of:

(A) Adjusting the pH of the effluent to between 8.0 to 9.5,
(B) Intimately contacting the aqueous effluent with an ozone-containing gas,
(C) Precipitating the converted lead compounds, and
(D) Separating the precipitated lead-containing compounds from the aqueous effluent.

This invention is based on the surprising discovery that ozone is highly effective in removing water-soluble organic lead compounds from waste water by producing water-insoluble products. Indeed, the discovery that ozone successfully converted the soluble products to water-insoluble materials was most surprising since air and other oxidizing agents have been found unsatisfactory to effect this removal. By the process of this invention, the dissolved alkyl lead can be removed from the aqueous effluent to such an extent that the aqueous effluent from tetraalkyllead manufacture can be safely discharged into lakes and streams. The process is easy to operate, and the quantity of materials, the time and intimacy of contact are easily coordinated to reduce the dissolved organic lead content to an acceptable level, below 5 p.p.m., or substantially nil if desired.

The process of the present invention is broadly applicable to the treatment of waste effluents produced in the manufacture of tetraalkyllead compounds, including methods based on the alkylation of sodium lead alloys, electrolytic methods of alkylating lead, and redistribution methods for producing mixed tetraalkyllead compounds.

This process is particularly applicable to the treatment of waste effluent from the manufacture of tetraethyllead by the reatcion of sodium lead alloy with ethyl chloride as disclosed, for example, in U.S. Patent 2,891,977, and of mixed methyl and ethyl alkyllead compounds by the redistribution of tetramethyl- and tetraethyllead mixtures with Lewis acid catalysts as disclosed, for example, in U.S. Patents 2,270,108; 3,151,141 and 3,151,142. All of these processes, together with the aeration purification process described above, tend to produce in the aqueous effluent water-soluble lead compounds not precipitatable by adjustment of pH to 8 to 9.5, such as those of the type $R_{4-n}PbX_n$ where R stands for methyl and ethyl, X for chloride or hydroxide, depending on pH of the solution, and $n$ equals 1 or 2.

Ordinarily the aqueous waste water to be treated may contain from about 5 to about 5,000 p.p.m. of lead in the form of water-soluble organic lead compounds not precipitatable by pH adjustment. It is believed that levels higher than 5,000 p.p.m. of soluble organic lead compounds, if ever encountered, can also be successfully reduced.

Ozone, its generation, and its use in chemical technology, is more fully described in Kirk-Othmer, "Encyclopedia of Chemical Technology," vol. 9, Interscience, pages 735–753; in No. 21 of the Advances of Chemistry Series, "Ozone Chemistry and Technology," Am. Chem. Soc., 1959; by Smith et al., "Organic Syntheses," vol. 26, pages 63–76; and by Bailey, Chemical Reviews, 58, 925–1010 (1958). For the present purpose, ozone is conveniently and economically produced by the action of an electric discharge on air or oxygen, whereby it is obtained diluted with the source gas in concentrations ranging from about 0.1 to 60 mg./liter of oxygen or air. Preferred concentrations are 20 to 40 gm./liter.

The quantity of ozone needed depends on the amount of lead compound present in the effluent. The ozone containing gas is contacted with the aqueous effluent until the soluble alkyllead content is reduced to below 5 p.p.m. Generally, considering the efficiency of gas-liquid contact and duration of contact, about 1.5 to 30 moles of ozone per atom of lead are sufficient to reduce the soluble lead content to below 5 p.p.m. About 3 to 20 moles of ozone per atom of lead are preferred.

Other carrier gases besides air and oxygen may be employed which are inert toward ozone at ordinary temperatures. Examples of such inert carrier gases are carbon dioxide, nitrogen, helium, neon and methane. However, for all practical purposes, the carrier gas will preferably be air.

The process comprises bringing ozone into intimate contact at ambient temperatures with the aqueous effluent by blowing the ozone carrier stream through the effluent at a rate sufficient to provide good gas-liquid contact. Flow rates of the order of 0.1 to 2 liters of ozone containing gas/min./100 ml. of liquid, preferably 0.2 to 1 liter of ozone containing gas/min./100 ml. of liquid, are sufficient to achieve adequate contact. No additional means of agitation are required.

The temperature at which the treatment is performed is not critical. Ordinarily it will be between 0° C. and 50° C.

As a result of contacting ozone with the soluble organic lead compounds, a precipitatable lead-containing product is formed. Before discharging, the effluent is adjusted to a pH between 8 and 9.5. If the pH is below 8, an alkaline reagent, such as an alkali metal hydroxide solution, which may be buffered, is added. If the pH is above 9.5, a water-soluble, non-toxic acid, e.g., hydrochloric or sulfuric acid, is added. Generally the effluent has a pH of 11 to 12, whereby acid is added.

The precipitation is accomplished in the presence of any anion which will produce an insoluble lead salt, such as a carbonate, sulfate, chromate or iodide. These anions are added to the effluent preferably in the form of their water-soluble alkali metal salts. Carbonate is preferred since it does not introduce into the effluent other objectionable substances which would in turn have to be removed before discharge. When the settling of the residue from the distillation or the washing thereof is carried out in the presence of air, and when an ozone-air mixture is used, there is absorbed an amount of carbon dioxide by the normally alkaline effluent sufficient to provide enough carbonate in the aqueous effluent to effect precipitation. It may be necessary, however, to add either carbon dioxide, water-soluble carbonates, such as $Na_2CO_3$, $NaHCO_3$, $K_2CO_3$, $(NH_4)_2CO_3$, and the like, or other anions to the effluent to effect precipitation of the insoluble lead salts when the washing steps are conducted in the absence of air and when a mixture of ozone and another gas is used, such as nitrogen. When a carbonate is used to effect precipitation, it is preferred to maintain at least 0.002% by weight of carbonate in the effluent and even more preferably from 0.02 to 0.04% by weight.

The ozone may be introduced either before or after the pH adjustment of the aqueous effluent. The effectiveness of the ozone treatment is not affected by the acidity or basicity of the effluent. It has been found to be convenient to adjust the pH first, introduce ozone, and thereafter remove the combined precipitate formed from both the organic and inorganic soluble lead compounds and then discharge the effluent. As a matter of convenience, therefore, the process where the pH is adjusted before the ozone treatment is preferred.

The precipitated lead compounds may be separated from the aqueous effluent by any conventional method, such as by decantation, filtration, or both in combination. The settling of the precipitate from the aqueous effluent may be assisted by the use of small amounts of flocculating agents which form flocculant precipitates in alkaline solution, such as salts of magnesium, aluminum, chromium, iron and zinc, particularly ferric chloride or aluminum chloride. These agents are usually added as dilute aqueous solutions with agitation, ordinarily in the proportion of about 20 to 60 p.p.m. of the effluent.

Representative examples illustrating the present invention follow. All parts are by weight unless otherwise specified.

In the following examples, ozone was generated in a Welsbach Model T-23 Laboratory Ozonator by passing dry air through the electric discharge of the ozonator. The air flow and the applied voltage was adjusted to vary the ozone concentration.

*Example 1*

The ozonator was adjusted to provide an ozone concentration of 43.2 mg. $O_3$ per liter of air which corresponds to 0.90 millimoles $O_3$/liter. The ozone-air stream was sparged through 200 ml. of an aqueous effluent, containing 0.6 g. (3700 p.p.m.) of triethyllead chloride, produced in the manufacture of tetraethyllead as described in U.S. Patent 2,891,977. The amount of soluble lead in the effluent was determined by the dithizone method. The pH of the aqueous effluent had been previously adjusted to 8 by the addition of hydrochloric acid. The ozone-air stream was sparked through the effluent at 0.56 liter/min. at ambient temperature (about 20° C.). After about one minute the solution became turbid and in about five minutes a yellowish-orange precipitate formed. Ozone sparging was maintained for about one hour. The ozone-air stream contained enough carbon dioxide to effect complete precipitation. The precipitate was filtered. Lead content of filtrate was determined as substantially nil by the dithizone method. In this run, 17 moles of ozone were used per mole of soluble lead compound.

*Example 2*

An effluent obtained as described in Example 1, and which contained 30 p.p.m. of lead as triethyllead chloride and which had a pH of 6.75, was adjusted to pH 9 by the addition of alkali. As in Example 1, an ozone-air mixture containing 28.9 mg. $O_3$/liter was sparged through a 100 ml. portion of this effluent. After 60 minutes, treatment was discontinued and the mixture filtered. The molar ratio of $O_3$ to lead treated corresponded to about 1000/1. The resulting filtrate contained only 2 p.p.m. of soluble lead.

*Example 3*

Tetraethyllead containing 0.6% by weight hexaethyldilead was treated in the presence of an equal volume of water with an ozone-air mixture at room temperature as hereinbefore described. After separating the tetraalkyllead product, the aqueous layer was brought to a pH of 13 by addition of NaOH. The resulting solution was analyzed and found to contain 4100 p.p.m. of soluble triethyllead ion, probably present as the hydroxide, and 400 p.p.m. of completely soluble inorganic lead, probably present as sodium plumbates. The presence and quantity of these organic and inorganic lead species were determined polarographically by known techniques. A 200 ml. portion of the above aqueous solution containing the soluble lead was treated at room temperature with ozonized air containing 24 mg. $O_3$/liter/minute for a total of two hours, after which time the solution contained no polarographically detectable triethyllead compound but still contained 120 p.p.m. of soluble inorganic lead. The pH solution was adjusted to pH 8 by adding $H_2SO_4$ and filtered. The filtrate contained nil soluble lead.

In this experiment about 20 moles of $O_3$ were used per mole of the soluble alkyllead compound.

As a result of the ozone treatment and subsequent removal of lead compounds, the aqueous waste effluent is rendered safe for disposal by discharging it into lakes and streams without serious contamination. In addition the lead-containing precipitate can be converted to metallic lead by well-known, conventional procedures for reuse, whereby valuable lead is thereby recovered.

It is understood that the preceding examples are representative and that said examples may be varied within the scope of the total specification as understood by one skilled in the art to produce essentially the same result.

As many apparently widely different embodiments of this invention may be made without departing from the spirit and scope thereof, it is understood that this invention is not limited to the specific embodiments thereof except as defined in the appended claims.

The embodiments of the invention in which an exclusive property or privilege is claimed are defined as follows:

1. A process for treating an aqueous effluent from the manufacture of alkyllead compounds, said effluent containing about 5 to 5000 p.p.m. of lead as dissolved organic lead, said dissolved organic lead being further characterized by remaining in solution after pH adjustment to between 8 to 9.5, which process comprises the steps of
    (A) adjusting the pH of the aqueous effluent to between 8.0 to 9.5,
    (B) intimately contacting the aqueous effluent with an ozone containing gas thereby converting said water-soluble organic lead products to water-insoluble products, and thereafter
    (C) precipitating the converted lead compounds, and
    (D) separating the precipitated lead-containing compounds from the aqueous effluent.

2. A process for treating an aqueous effluent from the manufacture of alkyllead compounds containing about 5 to 5000 p.p.m. of dissolved organic lead of the formula $R_{4-n}PbX_n$, where R is selected from the group consisting of methyl and ethyl, X is selected from the group consisting of chloride and hydroxide, and $n$ is an integer from 1 to 2, which process comprises the steps of
    (A) adjusting the pH of the aqueous effluent to between 8.0 to 9.5,
    (B) intimately contacting the aqueous effluent with an ozone containing gas thereby converting said water-soluble organic lead products to water-insoluble products, and thereafter
    (C) precipitating the converted lead compounds, and
    (D) separating the precipitated lead-containing compounds from the aqueous effluent.

3. The process of claim 2 wherein the aqueous effluent is first intimately contacted with an ozone containing gas and thereafter the pH of the effluent is adjusted to between 8.0 and 9.5.

4. The process of claim 2 wherein the ozone concentration in the gas is from 0.1 to 60 mg./liter of source gas and from 1.5 to 30 moles of ozone per atom of soluble lead are contacted with the aqueous effluent.

5. The process of claim 2 wherein the ozone concentration in the gas is from 20 to 40 mg./liter and from 3 to 20 moles of ozone per atom of soluble lead are contacted with the aqueous effluent.

6. The process of claim 2 wherein the ozone concentration in the gas is from 20 to 40 mg./liter and from 3 to 20 moles of ozone per atom of soluble lead are contacted with the aqueous effluent at a flow rate of from 0.2 to 1 liter ozone containing gas/min./100 ml. of liquid.

7. A process for treating an aqueous effluent from the manufacture of alkyllead compounds containing about 5 to 5000 p.p.m. of dissolved organic lead of the formula $R_{4-n}PbX_n$, wherein R is selected from the group consisting of methyl and ethyl, X is selected from the group consisting of chloride and hydroxide, and $n$ is an integer from 1 to 2, which process comprises the steps of
    (A) adjusting the pH of the aqueous effluent to between 8.0 to 9.5,
    (B) intimately contacting the aqueous effluent with an ozone containing gas until the aqueous effluent has been contacted with at least 1.5 moles of ozone per atom of soluble lead, thereby converting said water-soluble organic lead products to water-insoluble products,
    (C) precipitating the converted lead compounds in the presence of a carbonate concentration of at least 0.002% by weight of the effluent, and
    (D) separating the precipitated lead-containing compounds from the aqueous effluent.

References Cited by the Examiner

FOREIGN PATENTS

| | | |
|---|---|---|
| 572,192 | 3/1959 | Canada. |
| 127,263 | 1960 | Russia. |

References Cited by the Applicant

UNITED STATES PATENTS

| | | |
|---|---|---|
| 1,331,334 | 2/1920 | Field. |
| 2,400,383 | 5/1946 | Bertolette et al. |
| 2,410,356 | 10/1946 | Parmelee. |
| 2,426,789 | 9/1947 | Parmelee. |
| 2,440,810 | 5/1948 | Parmelee. |

OTHER REFERENCES

Mellor: "Comprehensive Treatise on Inorganic and Theoretical Chemistry," vol. 7, Longmans Green & Co., London, 1927, p. 681.

MORRIS O. WOLK, *Primary Examiner.*

MICHAEL E. ROGERS, *Examiner.*